UNITED STATES PATENT OFFICE.

JAMES BRIGHTMORE, OF TIDESWELL, ENGLAND.

PRODUCTION OF FERTILIZERS, FILTERING MATERIALS, AND THE LIKE.

No. 888,304.  Specification of Letters Patent.  Patented May 19, 1908.

Application filed October 16, 1907. Serial No. 397,721.

*To all whom it may concern:*

Be it known that I, JAMES BRIGHTMORE, a subject of the King of Great Britain, residing at Mayfield House, Tideswell, in the county of Derby, England, have invented certain new and useful Improvements in or Connected with the Production of Fertilizers, Filtering Materials, and the Like; and I do hereby declare the following to be a full, clear, and exact description of the invention, such as will enable others skilled in the art to which it appertains to make and use the same.

This invention has for its object an improved process for the production of fertilizing and filtering materials and the manufacture of such from waste products and lime, that is to say recovery by fixing and (or) combining nitrogen with lime and (or) limekiln refuse, slag or the like.

The nature of this invention consists in ionizing or (and) energizing a compound of lime or other such like substance by subjecting such mass or substance prepared as hereinafter described to the influence of electrolytic or ionizing action while in a moist or dry, or partly moist and partly dry state.

One method of preparing the material to be ionized or energized is as follows:—The lime, lime ashes, slag or the like is ground to a suitable state of division and (or) mixed with water to a suitable consistency. The mass so formed is either pressed or molded into blocks or slabs so that the ionizing or energizing operation may be more easily and simply performed.

While in a moist or partly moistened state, the mass or block is subjected to the influence of an electric current of suitable character. A simple way of generating such influencing current or condition is to place a sheet of copper in the bottom of the mold, and a sheet of zinc on the top and heating the mass for a suitable length of time while under such influence and such plates and molds can be used over and over again in preparing blocks. A suitable current may be supplied by any other suitable means, and the blocks may be treated singly or in series or in multiple arc arrangement or the mass be so ionized or energized by any other suitable arrangement of appliance or apparatus. After this heating and then cooling the porous mass I prefer subjecting the mass to an atmosphere of atmospheric air or nitrogen or a mixture of oxygen and nitrogen and then increasing the pressure by suitable arrangement to that of fifteen atmospheres, then gradually reducing the pressure to normal.

In some cases, especially where large quantities of material are to be treated, or the process is to be accelerated, I ionize the air or nitrogen, or a mixture of oxygen and nitrogen, by passing the necessary volume of air or gas or part of the necessary volume of air or gas through an electric arc, before bringing it into contact with the mass or block. The mass may be then subjected to super heated steam for a period of time and afterwards allowed to cool down gradually. The block or mass so prepared is then allowed to be acted upon by crude sewage or any fluid carrying nitrogen in manner as herein described. In so subjecting the mass to the nitrogenous fluid which it is intended to wholly or partly denitrify and (or) oxidize, I prefer treating the mass intermittently with such fluid, that is to say, I immerse the mass in the fluid for a period of time, and lift the mass out into the open air for a certain other period of time, and so immerse the mass and rest the mass intermittently until I consider the mass saturated or sufficiently impregnated with nitrogen in a fixed or partly fixed form, and (or) the fluid to be acted upon sufficiently oxidized or denitrified. The blocks or mass may also be used in filter beds or otherwise employed for filtering sewage or the like.

Any suitable means of appliance, apparatus or plant for carrying out this process and object may be applied.

Previous to use for fertilizing purposes the blocks are ground or otherwise reduced to a suitable form.

What I claim and desire to secure by Letters Patent is:—

1. The herein described process for the production of fertilizers from materials of the character described, such as lime, and lime ashes, consisting in reducing the materials to a suitable state of division, moistening with water, subjecting the moistened mass to the action of an electric current and heat and subsequently to the action of superheated steam, and finally exposing the mass to nitrogenous sewage.

2. The herein described process for the production of fertilizers from materials of the character described, such as lime, and lime ashes, consisting in reducing the materials to a suitable state of division, moistening with water, subjecting the moistened mass to the action of superheated steam, and then to the action of an electric current and heat, and finally exposing the mass to nitrogenous sewage.

3. The herein described process for the production of fertilizers from materials of the character described, such as lime, and lime ashes, consisting in reducing the materials to a suitable state of division, moistening with water, subjecting the moistened mass to the action of superheated steam, then to the action of an electric current and heat, and again to the action of superheated steam, and finally exposing the mass to nitrogenous sewage.

In testimony whereof I have affixed my signature, in presence of two witnesses.

JAMES BRIGHTMORE.

Witnesses:
ELDIN ALFRED KING,
FRED WORRALL.